United States Patent [19]

Bellows et al.

[11] Patent Number: 5,283,418
[45] Date of Patent: Feb. 1, 1994

[54] AUTOMATED ROTOR WELDING PROCESSES USING NEURAL NETWORKS

[75] Inventors: James C. Bellows, Maitland; Serge P. Barton, Oviedo, both of Fla.

[73] Assignee: Westinghouse Electric Corp., Pittsburgh, Pa.

[21] Appl. No.: 842,811

[22] Filed: Feb. 27, 1992

[51] Int. Cl.$^5$ ............................................. B23K 9/095
[52] U.S. Cl. ................................ 219/130.01; 395/22
[58] Field of Search .............. 219/130.01, 130.21, 219/124.34; 395/22, 21; 307/201

[56] References Cited

U.S. PATENT DOCUMENTS

| | | | |
|---|---|---|---|
| 4,561,059 | 12/1985 | Davis et al. | 364/477 |
| 4,589,140 | 5/1986 | Bishop et al. | 382/8 |
| 4,633,554 | 1/1987 | Clark et al. | 29/156.4 R |
| 4,660,166 | 4/1987 | Hopfield | 364/807 |
| 4,675,730 | 6/1987 | Adomaitis et al. | 358/106 |
| 4,679,077 | 7/1987 | Yuasa et al. | 358/108 |
| 4,724,524 | 2/1988 | Thomas et al. | 364/474 |
| 4,739,404 | 4/1988 | Richardson | 358/160 |
| 4,846,928 | 7/1989 | Dolins et al. | 156/626 |
| 4,853,680 | 8/1989 | Thomas | 340/680 |
| 4,868,649 | 9/1989 | Gaudin | 358/101 |
| 4,869,109 | 9/1989 | Miglianico et al. | 73/602 |
| 4,877,940 | 10/1989 | Pangs et al. | 219/124.34 |
| 4,893,388 | 1/1990 | Amos et al. | 29/156.8 R |
| 4,897,519 | 1/1990 | Clark et al. | 219/76.14 |
| 4,903,888 | 2/1990 | Clark et al. | 228/119 |
| 4,912,654 | 3/1990 | Wood | 364/513 |
| 4,916,625 | 4/1990 | Davidson et al. | 364/470 |
| 4,918,427 | 4/1990 | Thomas et al. | 340/680 |
| 4,918,517 | 4/1990 | Burgoon | 358/101 |
| 4,933,871 | 6/1990 | DeSieno | 364/513 |
| 4,940,390 | 7/1990 | Clark et al. | 416/241 R |
| 4,951,218 | 8/1990 | Okumura et al. | 364/477 |
| 4,954,964 | 9/1990 | Singh | 364/513 |
| 4,965,725 | 10/1990 | Rutenberg | 364/413.1 |
| 4,989,159 | 1/1991 | Liszka et al. | 364/508 |
| 4,995,087 | 2/1991 | Rathi et al. | 382/8 |
| 4,998,005 | 3/1991 | Rathi et al. | 219/121.83 |
| 5,001,714 | 3/1991 | Stark et al. | 371/26 |
| 5,159,660 | 10/1992 | Lu et al. | 395/22 |
| 5,204,872 | 4/1993 | Staib et al. | 395/22 |

OTHER PUBLICATIONS

DeMenthon et al, "Learned Classification of Welding Modes by a Neural Network with Acoustic Inputs", Aug. 1989.
Karsai et al, "Gas Tungsten Arc Weld Modeling Using a Mapping Network", *Neural Networks*, 1988, p. 341.

Primary Examiner—Clifford C. Shaw
Attorney, Agent, or Firm—M. G. Panian

[57] ABSTRACT

Methods and apparatus for monitoring an arc welding process are disclosed. In a preferred embodiment, the present invention creates a digital representation of the arc created during welding and, using a neural network computer, determines if the arc is representative of normal or abnormal welding conditions. The neural network disclosed is trained to identify abnormal conditions and normal conditions and may be adaptively retrained to classify images that are not in the initial set of normal and abnormal images. In certain embodiments, other data, such as current, weld wire emission spectra, or shielding gas flow rate are also collected and the neural network is trained to monitor these data. Also, in certain embodiments, an audio signal is collected from the vicinity of the welding process and is used by the neural network computer to further classify the arc as normal or abnormal. The present invention is most preferably implemented in repetitive and continuous welding operations, such as those encountered in the manufacture and rebuilding of steam turbines.

25 Claims, 4 Drawing Sheets

PRIOR ART

AUTOMATED ROTOR WELDING PROCESSES USING NEURAL NETWORKS

The present invention relates to automated welding systems and, in particular, relates to arc welding systems for rebuilding turbine rotors using neural network computer technology.

BACKGROUND OF THE INVENTION

The possibilities of applying logic to industrial processes to enhance their efficiency has long been recognized, even prior to the advent of electronic logic circuits and computers. One form of control that has advanced along with computer technology is pattern recognition. For example, U.S. Pat. No. 4,589,140—Bishop discloses a system that uses a video camera to compare magnified images of circuit boards. Similarly, a video surface inspection system disclosed in U.S. Pat. No. 4,675,730—Adomaitis et al. compares surface patterns to reference images and determines if an inspected surface falls within pre-determined minimum or maximum "grey level" values for the image.

Pattern recognition concepts are also useful when the "pattern" is not a video image of an object, but is instead a signal related to a characteristic. Thus, the sensed vibrational patterns of a machine tool can be analyzed using a pattern recognition system to determine tool breakage or other abnormal conditions as disclosed by U.S. Pat. No. 4,918,427—Thomas et al.; U.S. Pat. No. 4,853,860—Thomas; and U.S. Pat. No. 4,724,524—Thomas et al.

Recent progress in computing technology and the application of cognitive science to industrial processes has led to so-called expert systems that are capable of reasoning and decision making beyond simply identifying whether a particular pattern "matches" a stored pattern. For example, U.S. Pat. No. 4,916,625—Davidson et al. describes an expert system as a software program that contains information concerning a real world situation or environment that makes inferences about a given state or change. Thus, an expert system will generally contain a knowledge base and an inference mechanism to manipulate the data in the knowledge base and collected data. The system disclosed by Davidson et al. manages the task of optimizing a fiber spinning operation in real time by sensing the occurrence of events and applying a set of rules and inferences derived from the knowledge base to collected data. Expert systems are based on inductive reasoning or scientific knowledge and can therefore draw conclusions from data. As disclosed in U.S. Pat. No. 4,954,964—Singh, certain tasks normally undertaken exclusively by a human operator can be performed by a properly constructed expert system. The expert system disclosed by Singh accepts data concerning failed metal components and performs an analysis to determine the cause of the failure. By using a rule-based investigation, logically incorporated into a knowledge base, the cause of the failure can be systematically determined in much the same way a trained human failure expert makes similar determinations. Expert systems are also sometimes referred to as adaptive inference systems. For example, U.S. Pat. No. 5,000,714—Stark et al. discloses a system that locates faults in electrical or electronic assemblies.

The above-identified systems all require making sequences of logical decisions using large volumes of data. Since these systems are applied to actual processes, it is desirable that the logic be completed in as short a time as possible. Ideally, expert systems and the like should not delay the processes which they control. Those of ordinary skill will readily appreciate that in most practical instances, the computing power required to achieve this goal is immense and rarely cost-effective. Conversely, if a limited amount of computer assets are available, the system operates far too slowly to be practical. For this reason, expert systems are frequently created using advanced data processing and computer techniques that reduce either the computational power required or increase the processing speed, or both. However, these expert systems ultimately rely on algorithmic computing, i.e., they must be programmed with a specific set of "rules."

Another technique for implementing a complex computational task such as that performed by algorithmic expert system software is the use of a neural network. The term "neural network" is derived from the structural similarity of such systems to biological neural networks and their ability to exhibit self-learning. One advantage of neural network computers is their general applicability to many types of diagnosis and classification problems. Neural networks can process a wide variety and a large number of inputs which must be correlated to produce an output. For example, U.S. Pat. No. 4,965,725—Rutenberg discloses a neural network-based system for automatically classifying the images of cells generated by a microscope, a task previously performed by human operators. Neural networks differ from algorithmic computers and the expert systems discussed above in that the goal of neural learning is not the formulation of an algorithm or a set of explicit rules. During learning, a neural network self-organizes to establish a global set of weighted connections between parallel processors which will result in an output for a given input that most closely corresponds to what the network is told is the correct output for that input. It is this adaptive acquisition of connection strengths that allows a neural network computer to behave as if it knows the rules.

While a neural network computer is being trained, errors, which are defined as the difference between the appropriate output for an exemplary input and the actual output for that input, are propagated backwards from the output through the neural network to the input portion of the system. The errors are utilized at each layer of processing elements by a training algorithm to readjust the interconnection weight so that a future presentation of the exemplary pattern will result in the appropriate output. Unknown input patterns can also be classified by a neural network by placing them into the exemplary category which most closely resembles the input. Neural network learning is disclosed, for example, in U.S. Pat. No. 4,916,654—Wood.

Although welding might typically be classified as an industrial process, it has been recognized that welding requires highly skilled personnel who have acquired a skill set that permits them to vary welding parameters to achieve consistent, high quality welds. It would be desirable, however, to automate welding processes in a manner that would impart the skill of an experienced welder to the automated system. Toward this end, others have attempted to automate certain aspects of various types of welding systems. For example, U.S. Pat. No. 4,561,059—Davis discloses a microprocessor controlled arc welding power supply. Systems disclosed in U.S. Pat. Nos. 4,995,087 and 4,998,005, both to Rathi et al., automate welding to the extent that the process parameters for welding a work piece are pre-determined by digitizing a video image of the work piece. Others have attempted to adaptively control welding processes in real time by observing the weld "puddle" of molten metal formed during the process. For example, U.S. Pat. No. 4,739,404—Richardson discloses controlling a welding process by observing the oscillations in the size of the weld pool. Another pattern recognition system that uses video images of the weld puddle is disclosed in U.S. Pat. No. 4,877,940—Bangs et al. Others have also disclosed systems for permitting the visual monitoring of a weld site by filtering the arc light from the image. Examples of such systems are disclosed in U.S. Pat. No. 4,868,649—Gaudin and U.S. Pat. No. 4,918,517—Burgoon, the latter of which is assigned to the assignee of the present invention.

It is also known that the shape or position of the arc itself can provide information concerning the welding process for purposes of automation as disclosed in U.S. Pat. No. 4,951,218—Okumura et al.

Within the field of welding generally, it is well known that it is often possible to rebuild or restore worn or broken components by applying one or more weld beads and machining or finishing the repaired area. Such rebuilding may be undertaken, for example, on cylindrical objects such as portions of turbine rotors. Methods of repairing, rebuilding or modifying steam turbine rotors are disclosed in, for example, U.S. Pat. Nos. 4,633,554; 4,897,519; and 4,903,888, all issued to Clark et al., and U.S. Pat. No. 4,893,388 to Amos et al., all of which are assigned to the assignee of the present invention. Another example is the use of welding may be used to rebuild the turbine rotor steeples which provide blade attachments on a turbine rotor. Cracks in the steeples severely limit the life of the rotor; therefore, to prevent possible consequential damage from blade loss during turbine operation, rotor discs must be built up to a predetermined contour by welding and new steeples machined into the rotor discs.

In rotor welding processes, a new disc is built up by continuously winding a relatively fine filler wire or weld wire, typically about 0.0625 inches (0.159 cm) in diameter, on to the surface of a rotor while it is rotating at about 30 min./revolution (0.033 revolutions/min.). Simultaneously, this wire strand is automatically welded side-by-side to previously welded strands, and a weld deposit is typically built up to a width of about 4-5 inches (10-13 cm) and a depth of about 3 inches (7.6 cm) or more. The weld build-up is preferably formed of fine filler wire to avoid overheating the disc material during welding. Overheating would create damage in heat-affected zones, resulting in, for example, poor corrosion properties and reduced durability. However, it will be readily appreciated that building up a surface with fine filler wire is time-consuming.

Figure 1:
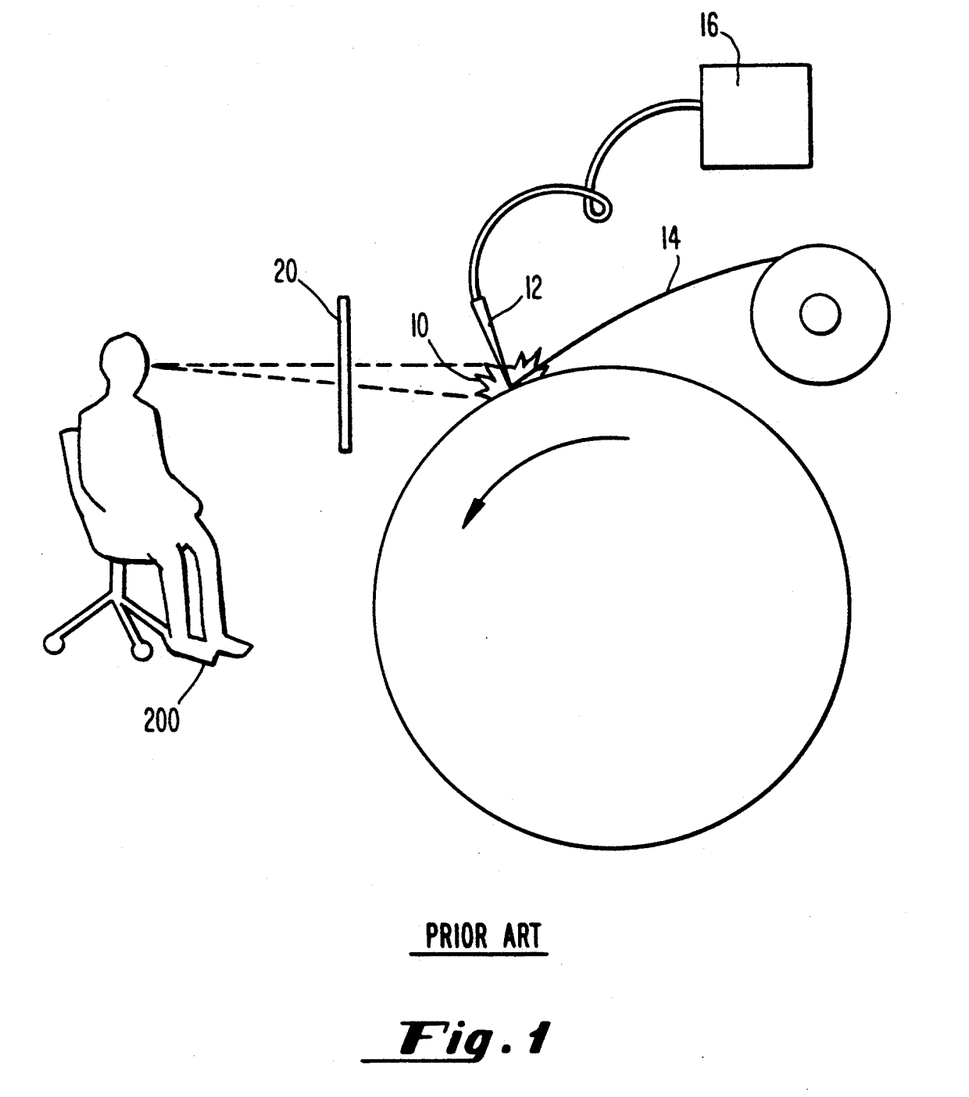
FIG. 1 is a partial diagrammatic illustration of a prior art rotor welding process.

A partial diagrammatic representation of the above-described process is illustrated in FIG. 1. A torch 12, a power supply and source of shielding gas 16 generate a welding arc 10. During the lengthy welding process, an operator 200 must visually monitor the welding arc 10 by viewing it through a filter 20. Additionally, at the end of each winding and welding revolution, the operator 200 must reposition the torch 12 to begin welding the next row of wound-on filler wire 14. This repositioning step, called indexing the arc, takes just a few seconds. However, at present a dedicated operator 200 is required for monitoring and indexing each welding machine. Thus, most of the operator's time is spent watching the arc 10 for anomalies. However, such anomalies occur relatively infrequently because of the use of automated welding equipment. Consequently, operator boredom can lead to associated problems such as lapses in worker concentration, diminished weld quality, and low worker morale.

It is therefore an object of the present invention to provide a system for monitoring arc welding that can monitor an arc and detect anomalies during the welding process. A further object of the present invention is to provide such a welding system that has been taught to distinguish normal arc from abnormal arc using both audio and visual data.

SUMMARY OF THE INVENTION

The present invention attains these and other objectives through the application of neural network technology to enhance automated welding processes. In a preferred embodiment an automated video monitoring system for monitoring a weld arc uses the pattern recognition capabilities of a neural network's adaptive information processing architecture to automatically differentiate between normal and abnormal weld arcs. In addition to monitoring a video image of the arc, in certain embodiments, other arc parameters such as audio data are input to the neural network and integrated to provide a comparison between normal and anomalous patterns. Most preferably, an error alarm signals the operator and a message screen displays diagnostic information for the arc image observed. The specific application to rotor welding processes disclosed provides benefits of improved quality and precision; reduced operator error; improved manpower work level; potential automation of the arc indexing operation; time saving and schedule improvement; and reduced cost. An additional advantage of the present invention is that it can certify regions of the weld to be free from detected anomalies, and can also develop the information required to maximize production.

DETAILED DESCRIPTION OF THE PREFERRED EMBODIMENTS

Figure 2:
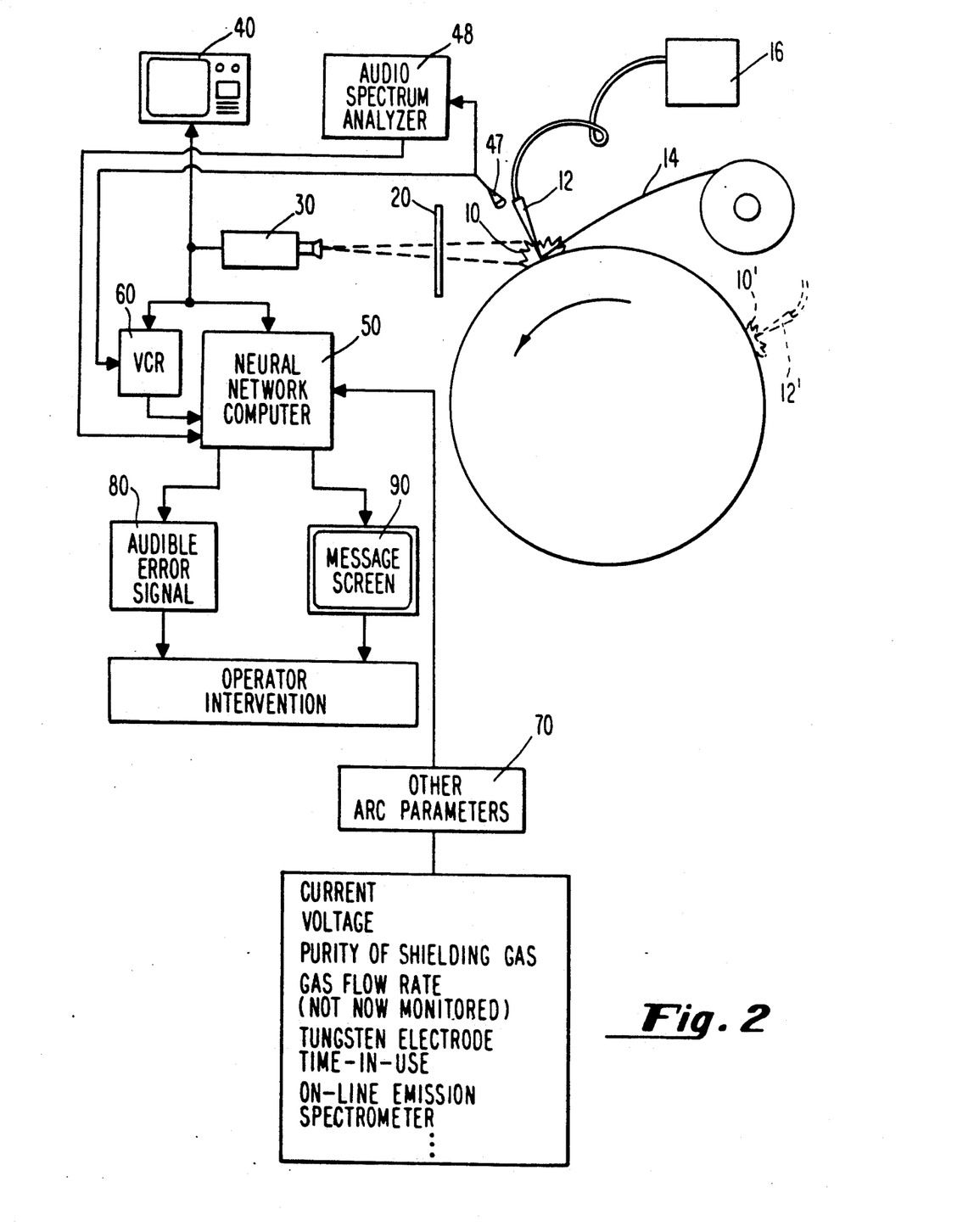
FIG. 2 is a partially diagrammatic, partially schematic illustration of the welding process of the present invention.

The present invention applies neural network technology to enhance the above-described automated rotor welding process or other arc welding processes. The present invention enables automated monitoring of the weld arc, and uses the pattern recognition capabilities of the neural network computer's adaptive information processing architecture to automatically differentiate between normal and abnormal weld arcs. Referring now to FIG. 2, a partially diagrammatic, partially schematic representation of the present invention is shown. The weld arc 10 is preferably monitored through a UV/intensity reduction optical filter 20 by a video camera 30. A video monitor 40 may also be provided in certain embodiments, and is particularly useful during the early training and retraining stages described below. Monitored video images are digitized to be processed by an image preprocessor 45, which reduces the voluminous image data to the important features discussed below with reference to FIG. 4. In the image preprocessor 45, the digital intensities in the various image pixels are compared. The intensity comparison is based upon the pattern of lines of constant intensity as discussed below with reference to FIG. 4. This is preferably accomplished either in a fast digital computer or in a parallel processing array.

Figure 4:
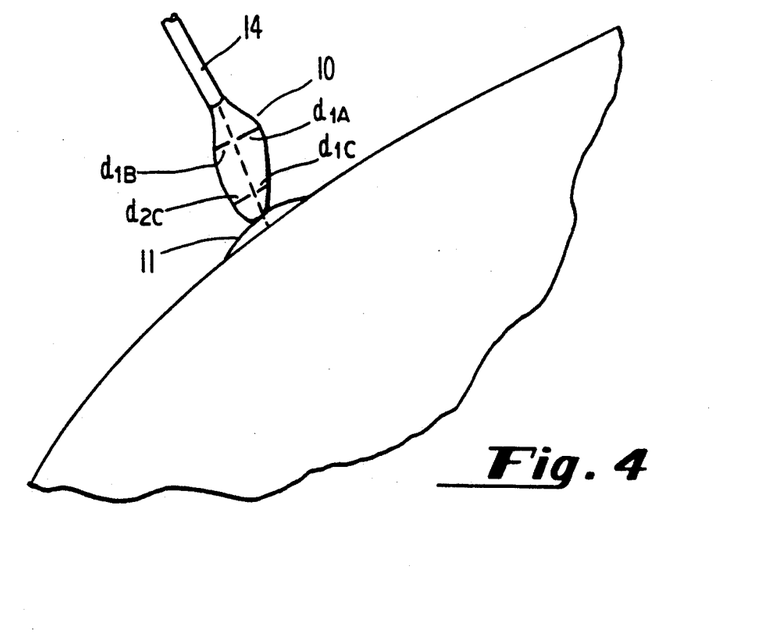
FIG. 4 is a view of an arc and a work piece, illustrating those portions of the arc that are monitored.

Reduced image data include the location of maximum intensity and the changes in that location over time. This can be represented as an average location, present location, and difference between the average and the present locations. Since the location of the weld needs to be indexed periodically, the average location at a previous point in time is an important parameter. As seen in FIG. 4, much of the information about the arc 10 is contained in its size, direction, and symmetry. This information is developed by determining the locus of points where the intensity falls below a certain fraction of the maximum intensity. Thus, as seen in FIG. 4 lines of constant intensity $d_{1A}-d_{1B}$ are found in a typical arc. The number of fractions depends upon the desired quality of differentiation between normal and abnormal arcs. Factors of ten will give a coarse differentiation. Factors below two require considerable extra computing and are seldom valuable. The most reasonable starting point is factors of the square root of ten (3.16). Computing the distance from the point of maximum intensity to the various lines of constant intensity provides a spectrum of distance versus the number of occurrences, which represents the size of the arc 10. The direction of the arc 10 can be determined by the average vector from one end to the other of a line of constant intensity. Since there will be a line on each side of the arc 10, the average of these two lines estimates the centerline. This averaging is then preferably performed over all lines of constant intensity, as shown by the dotted line in FIG. 4.

The length of the arc 10 will be determined by the filler wire or electrode 14 and the pool of molten metal 11. These are both at a lower temperature than the arc 10 and represent an abrupt change in temperature. This can be recognized as two lines of constant intensity being very close together. Symmetry is determined by the difference in distance from the centerline to the pairs of lines of constant intensity, from side to side and end to end. Thus, differences between the distance $d_{1a}$ and $d_{1b}$ indicate the side-to-side asymmetry and differences between distances $d_{1A}-d_{1C}$ indicate the end-to-end asymmetry. These differences are scaled to the arc size and organized as a spectrum of side-to-side difference versus the number of occurrences, and as a spectrum of end-to-end difference versus the number of occurrences. Changes in symmetry are the most relevant data, so the spectra are examined to determine the difference between the present spectrum and the average over the last minute or other period of time. As noted above, the size of the pool of metal 11 is also an important parameter and is determined as the radius of a line of constant intensity. This intensity is selected dynamically as the lowest of the bunched intensity lines used above to determine the end of the arc.

Monitored video images are preferably recorded by conventional videocassette recorder 60 for use in further training of the neural network computer 50 if needed, as explained below. The preprocessed image data is transmitted to the neural network computer 50. Other arc parameters may be input by one or more data collection means 70 to the neural network computer 50, such as changes in welder current or voltage, presence or loss of gas shielding, and time-in-use of the tungsten electrode. Additionally, in certain embodiments, the sound of the welding process is collected by a microphone 47, preferably recorded as the audio track on the videocassette recorder 60, and transmitted to an audio spectrum analyzer. The spectrum is preferably divided into approximately fifteen regions from 60 to 15,000 Hz. The boundaries of each region are preferably a geometric progression with frequencies ratios of approximately 1.5. The audio spectrum data are then transmitted to the neural network computer 50. Alternatively, the audio intensity at approximately 27 different frequencies in a geometric progression from 50 to 16,500 Hz with frequency ratios of 1.25 may be used.

The present invention preferably uses commercially available neural network computers such as the NeuralWorks Professional II/Plus sold by NeuralWare, Inc., Pittsburgh, Pa. Those of ordinary skill will understand that one or more of the above-described types of data and a variety of other data can be collected using sensors and the like to provide signals that can be input to the neural network computer 50. Additionally, in certain embodiments of the present invention where changes in filler wire composition are a concern, the data collection means 70 includes an on-line arc emission spectrometer. In any embodiment, however, if the neural network computer 50 determines that the monitored arc images do not match any of the visual patterns that the neural network computer 50 has been trained to recognize as "normal," then an error alarm 80 is activated. Thus, in a preferred embodiment, the neural network computer 50 compares the monitored image with visual patterns that indicate specific anomalies. In certain embodiments, information from other monitored parameters such as those collected by the data collection means 70 or the audio data collected by the microphone 47 are integrated into a more complex comparison of patterns. If the arc character changes, the neural network 50 compares and classifies the image. Preferably, a message display 90 displays this information.

Finally, in certain embodiments, the present invention permits multiple torches to be applied to a single disc. Multiple video monitors can readily observe multiple arcs. As shown in phantom in FIG. 2, a second torch 12' is preferably spaced between 90° and 120° along the circumference of the disc from the first torch 12 to permit sufficient time for the disc to cool between the first and second arcs 10, 10'. The pattern of the second arc 10' is either observed using the camera 30 shown in FIG. 1 or using a second camera, if desired. Additionally, a second audio channel is included in certain embodiments to monitor the sound produced by the second torch 12.

Figure 3:
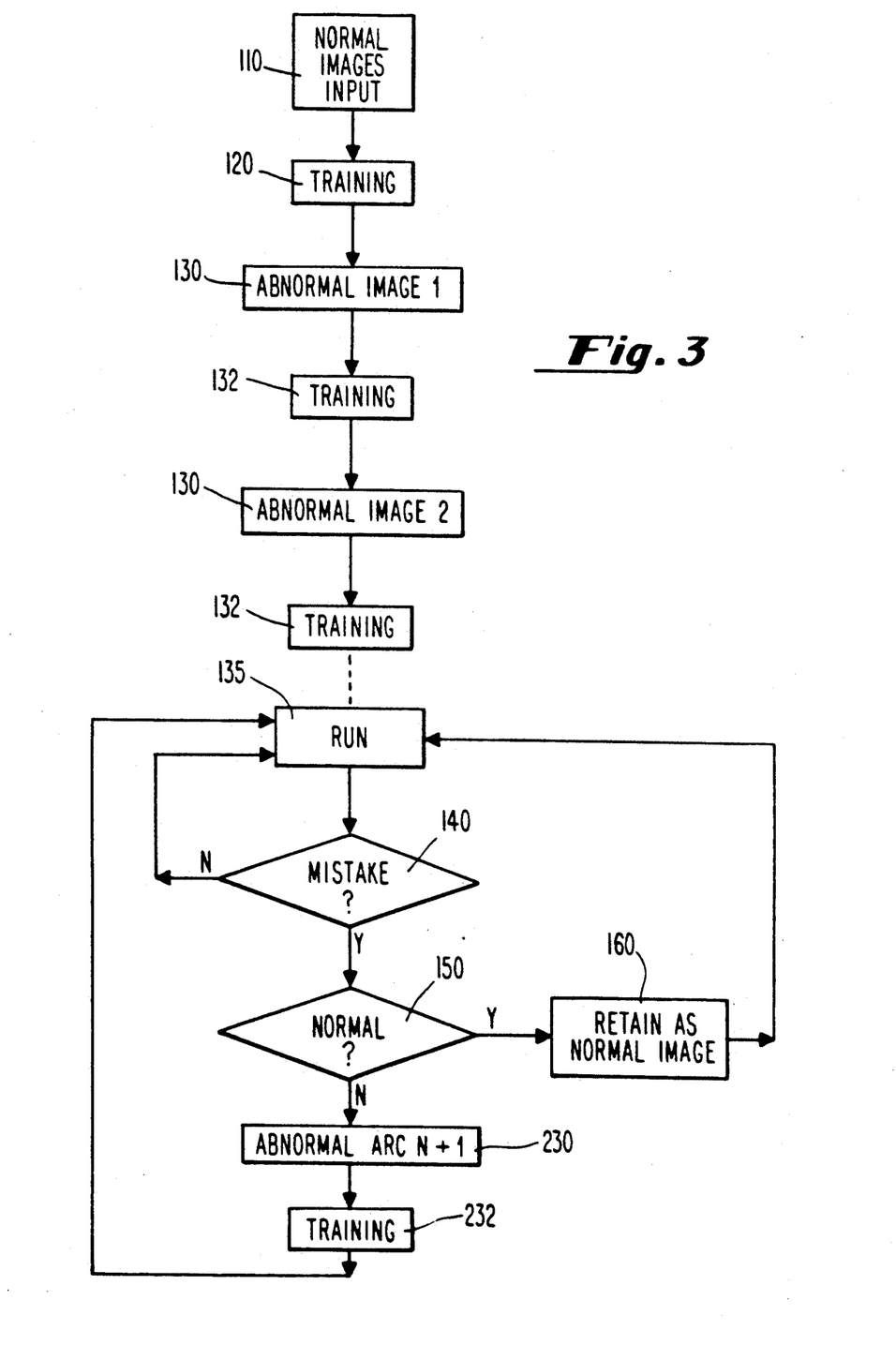
FIG. 3 is a schematic of the training/retraining aspect of the welding process of the present invention.

FIG. 3 shows a flow chart of the neural network training and retraining aspects of the present invention, in which the neural network computer 50 is enabled to distinguish between normal and abnormal arc data. Initially, a number of digitized arc images and other data, such as audio data, that are within the range of normal conditions are input during an input step 110. The neural network 50 is then trained at a training step 120 to match the data related to normal arcs with the digitized images input at the input step 110, and thereby learns to "recognize" images and other data indicative of a normal arc. This initial set of normal data permits the neural network computer 50 to monitor arcs and distinguish between the normal and the anomalous. As a further part of the training step 120, subsequently monitored arc data are collected by the video recording means 60 shown in FIG. 2 and, in some embodiments, the microphone 74 also shown in FIG. 2. These data are used to complete the baseline definition of "normal" by expanding or refining the normal range, until the desired degree of definition is achieved. Next, abnormal arc data are input at an abnormal data input step 130. These data are indicative of known anomalous conditions and the neural network computer 50 is trained at a training step 132 to recognize them. For example, the anomalous images might include conditions such as changes in current or voltage, electrode erosion, loss of gas shielding, contaminated weld wire, changes in weld wire composition, feed rate, arc travel rate or the weld line being spaced too close or too far from the previous bead. As depicted in FIG. 3, data relating to different type anomalous conditions are input at a series of input steps 130 and the neural network is trained at a series training step 132 using these input images.

The knowledge base built by the above-described steps of inputting images and training the neural network computer permits the system of the present invention to be run 135 to monitor an actual arc. When the neural network computer 50 determines that the arc is not in the set of normal and abnormal images the computer implements a decision step 140 to retrain itself, that is, when it encounters new arc data or fails to distinguish correctly between a normal and an anomalous arc, the recorded video and/or audio or other data relating to the event are digitized and used to retrain the neural network computer 50. A retraining algorithm is initiated that comprises the steps of determining if the arc is normal at a second decision step 150, and either retraining the neural network to recognize these data as a normal image in a retraining step 160 or as an abnormal image at an input step 230 and training step 232. As explained generally above, the retraining process enables neural network computers to refine their capacity to differentiate images. This ongoing refinement is characteristic of the dynamic, adaptive learning capability of neural network computers.

In addition to monitoring the welding arc 10, in certain embodiments of the present invention the neural network may serve other important uses such as monitoring the arc indexing at the end of each rotor revolution. Training the neural network computer 50 to distinguish normal and anomalous indexing arc images is carried out using a process similar to that shown in FIG. 3 and enables the automation of the indexing task. At present, the dedicated machine operator 200, discussed above with reference to FIG. 1., must reposition or reset the arc manually at the end of each winding/welding revolution, i.e., approximately every thirty minutes in the case of the turbine rebuilding discussed above. Using the present invention, the neural network computer 50 can be trained to recognize images of correct arc indexing, and can direct automated equipment to index the arc to replicate a normal image.

Thus, the output of the neural network computer 50 is a decision that the weld is good or not good. This information and the positions of the weld and the work piece are preferably continuously supplied to a quality assurance computer program. Whenever the neural computer output indicates a weld anomaly, the work piece position and the weld position are recorded. The output of the program is a list of weld anomaly incidents. The entire volume between incidents can be considered anomaly free due to the skill of the neural computer at determining weld anomalies. Additionally, the digitized image of the weld arc are stored for reference when the neural computer indicates a bad weld. The corrective actions required for each instance of bad weld are also recorded. These corrective actions and the digitized images are preferably transmitted to another neural network computer which learns to recognize the symptoms of each specific weld problem. After time this second neural network computer can be used to control the weld variables.

Figure 5:
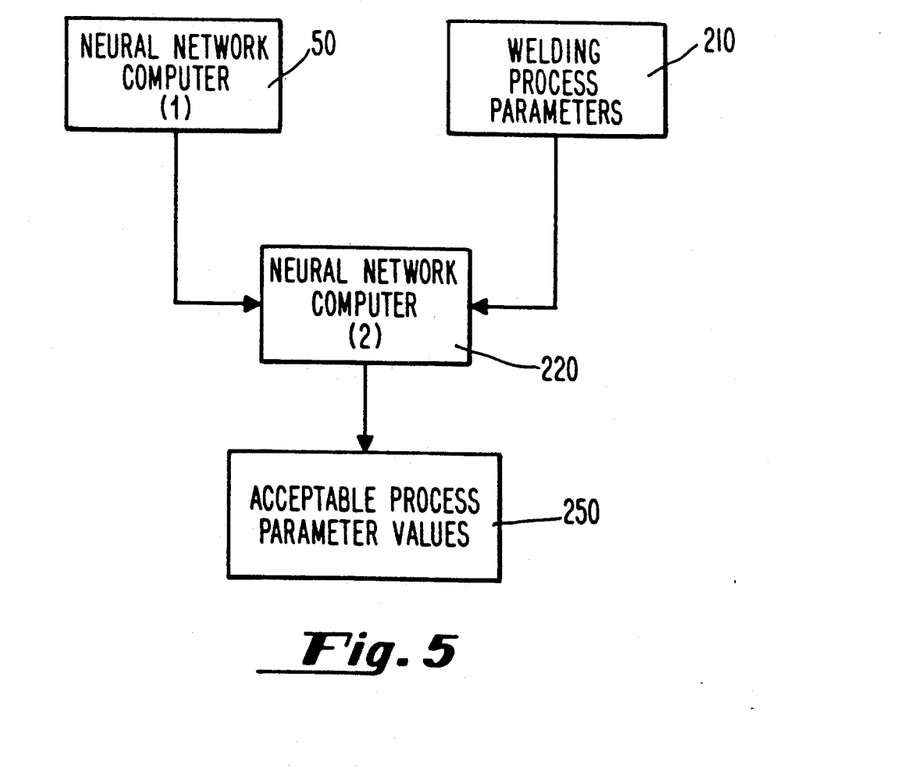
FIG. 5 is a schematic of a system that uses a second neural network computer to optimize output.

Referring now to FIG. 5, the output of the first neural computer 50 is shown as being connected to the second neural computer 220. Additionally, the separately controlled process parameters 210 of the weld, such as rotational speed of the work piece, length of the arc, voltage, filler wire speed and the like are supplied to the second neural network computer 220, which may in some embodiments be a separate process in the multitasking computer. While the welding is in process, the second neural network computer 220 runs continually in the learning mode. When there is a weld problem detected by the first neural network computer 50, the second neural network computer 220 learns that this combination of control variables is unacceptable. When the weld is proceeding normally, the second neural network computer 220 learns that this combination of welding process parameters is acceptable. In time, the second neural network computer 220 develops a polydimensional map at an output step 250 of the acceptable combinations of process parameter values. The welding engineer can then use this map to set the process parameter values for maximum production with minimum anomalies. An alternative implementation of this feature stores the previously mentioned data, along with the work piece and welder locations. The location of all anomalies detected by post-welding inspection techniques is added to these data. The post-welding anomalies are detected by, for example, magnetic particle or eddy current testing. The second neural network computer 220 uses all this information and is run after the weld is completed to develop the map of acceptable combinations of control variables.

The present invention provides numerous benefits and advantages including improved quality, since the welding process is less operator-dependent. This decrease in operator dependency provides increased precision, reduces operator error, reduces operator fatigue, boredom and improves operator morale. The present invention also provides the possibility for expanded automation, and as explained immediately above, may enable automation of the arc indexing operation. Moreover, an adaptable system is provided since the neural network computer can be trained to any level of discrimination from which patterns (in this case video images) can be obtained. However, it will be appreciated that the present invention makes no other changes to the established rotor welding process. An additional advantage of the present invention is that the superior monitoring characteristics provided allow the process to be performed closer to the parameter tolerance limits and thereby enable the process to be completed in less time. For the specific application disclosed, a speed increase of only 10% translates into a full day in scheduling time saved. Another benefit of the present invention is an improved operator output level. After the neural network system disclosed is trained, operators can assume other functions. With the specific disclosed application of the automated process of the present invention, one operator per shift could monitor three or more welding machines, compared to one operator per shift now dedicated to each machine.

Although certain applications of the present invention have been described with particularly, the specific embodiments disclosed are exemplary and are not intended to limit the present invention. Upon review of this specification, those of ordinary skill will immediately realize that numerous adaptations, variations and modifications of the present invention are possible. Accordingly, reference should be made to the appended claims in order to ascertain the scope of the present invention.

What is claimed is:

1. A method of controlling arc welding apparatus comprising the steps of:
    recording one or more arc images formed during normal and abnormal conditions respectively during a welding operation;
    training a neural network computer to recognize arc images indicative of normal and abnormal conditions;
    observing an arc during an occurring welding operation, and generating arc data;
    determining if said arc data represents a normal or abnormal condition using the neural network computer; and
    generating a control signal if the occurring welding operation is in an abnormal condition.

2. The method of claim 1 wherein the step of observing an arc comprises viewing the arc using a video camera to create a video image and digitizing the video image.

3. The method of claim 2, further comprising the step of transmitting the video image to a video monitor.

4. The method of claim 2, further comprising the step of transmitting the video image to a video recorder.

5. The method of claim 1 wherein the control signal activates an audible alarm.

6. The method of claim 1, further comprising the step of processing the control signal to characterize the abnormal condition; and displaying an error message identifying the nature of the abnormal condition.

7. The method of claim 1, further comprising the steps of collecting data indicative of the condition of one or more welding process parameters; training the neural network computer to recognize normal and abnormal values for said welding process parameters; and generating a control signal if the occurring welding condition exhibits an abnormal value for one or more of said welding process parameters.

8. The method of claim 7 wherein one of the welding process parameters for which data is collected is electrical current.

9. The method of claim 8 wherein the step of collecting data comprises determining changes in welding wire composition by measuring the emission spectrum of the weld.

10. The method of claim 1, further comprising the steps of recording an audio signal generated during a welding operation, digitizing the signal and processing the signal in conjunction with the arc images to determine if the welding operation is in an abnormal condition.

11. Automated arc welding apparatus comprising:
    a power supply and source of shielding gas in combination with and connected to an arc torch for welding weld wire to an object;
    filter means for providing a view of the arc created during welding;
    camera means for creating an image of the view;
    a neural network computer comprising image digitizing means for producing a digital representation of the image and means for classifying the arc using the image, comprising a neural network computer apparatus programmed to classify the digital representation as a function of its training; and
    error signal means for indicating the existence of an abnormal arc image.

12. The apparatus of claim 11, further comprising a monitor means for viewing the image created by the camera means.

13. The apparatus of claim 11, further comprising a video recorder means for recording the image created by the camera means.

14. The apparatus of claim 11, further comprising means for collecting data indicative of the condition of one or more welding parameters and means for transmitting said data to the neural network computer.

15. The apparatus of claim 14 wherein said means for collecting data comprises means for measuring the current drawn by the power supply.

16. The apparatus of claim 14, wherein said means for collecting data comprises emission spectrometer means for measuring the emission spectrum of the arc to determine composition changes in the welding wire.

17. The apparatus of claim 14, wherein said means for collecting data comprises flowmeter means for collecting data indicative of the flow rate of the shielding gas.

18. The apparatus of claim 11, wherein said error signal means comprises means for creating an audible error signal.

19. The apparatus of claim 11, wherein said error signal means comprises display means for creating a visual indication of the occurrence of an abnormal arc image.

20. The apparatus of claim 11 further comprising at least a second arc torch for welding weld wire to an object, spaced apart from the first arc torch, and a camera means for creating an image of the arc created by said second arc torch.

21. The apparatus of claim 11, further comprising a microphone for collecting an audio signal created during welding that is connected to the neural network computer, whereby the audio signal is used by the neural network computer to classify the arc.

22. A method of training a neural network computer for monitoring an arc welding process comprising the steps of:
    creating a plurality of digital representations of normal arc images;
    transmitting the normal image representations to the neural network computer along with information identifying the images as normal;
    creating a plurality of digital representations of abnormal arc images;

transmitting the abnormal image representations to the neural network computer along with information identifying the images as abnormal;

recording video images of new arc images that differ from the normal and abnormal images;

creating a digital representation of the new arc images;

transmitting the new image representations to the neural network computer along with information classifying the new image as normal or abnormal.

23. The method of claim 22, wherein the arc welding process comprises welding steam turbine components.

24. The method of claim 22, further comprising the steps of creating an audio signal representative of a welding operation; and training a neural network computer to distinguish between normal and abnormal audio signals.

25. The method of claim 22 further comprising the steps of:

transmitting data indicative of normal and abnormal arcs to a second neural network computer;

concurrently inputting data indicative of one or more welding process parameters into the second neural network computer; and identifying combinations of welding process parameters that produce the normal arcs and those that produce the abnormal arcs.

* * * * *